United States Patent Office 2,715,068
Patented Aug. 9, 1955

2,715,068

COMESTIBLE AND COMESTIBLE BASE AND METHOD OF MAKING THE SAME

Harry M. Levin, Philadelphia, Pa.

No Drawing. Application March 20, 1953,
Serial No. 343,811

9 Claims. (Cl. 99—144)

My invention is a soft plastic acidulated comestible, suitable for use as a salad dressing or bread spread, and a method of making the same.

In its preferred form, the comestible comprises a soft plastic, acidulated base having as its principal nutritious constituent a pasteurized aqueous dispersion of dried defatted milk solids which is preferably stabilized with edible gum, enriched with milk fat and combined with mayonnaise to form a product having all the desirable characteristics of salad dressing but devoid of the undesirable characteristics commonly resulting from the incorporation of starch in usual salad dressings.

Such product provides a food which has a good shelf life; which is free from the jelling, salvy, waxy and crumbling tendencies of dressing containing a substantial proportion of cooked starch; which is rich in fats, carbohydrates and proteins, and contains small amounts of mineral elements and vitamins and which is palatable, readily digestible, wholesome and economical.

To provide a product of desirable consistency, smoothness and palatability it is desirable that my improved base contain approximately .3 to .6 part, by weight, of dried, defatted milk solids per part of aqueous portion, approximately .25 to .5 part, by weight, of milk fat per part of such milk solids, sufficient edible acid or acids to impart an acidity equivalent in bacteriastatic potency to at least 2.2% acetic acid based on the aqueous portion, and that the base be mixed with such amount of mayonnaise that the resultant composition consists of at least 30%, by weight, vegetable oil and milk fat together.

The heating of a concentrated aqueous dispersion of defatted milk solids and a small portion of gum (e. g. locust bean gum) to or slightly above a pasteurizing heat and the acidification of the hot mixture produces, when cooled, a smooth paste which is resistant to the action of bacteria and milk enzymes, but which, alone, or even when sweetened, salted or spiced, has a somewhat caseinous taste and odor which may be objectionable to some people. I have, however, found that such taste and odor may be caused to disappear, and the paste rendered more creamy and viscous by the inclusion in the dispersion of fresh milk fat in the proportion of from .25 to .5 part, by weight, per part of dried milk solids.

The following is an example of the proportions and steps which may be used in the practice of my invention.

375 pounds of dried, defatted milk solids, 100 pounds of cane sugar and 7½ pounds of locust bean gum are thoroughly dispersed in about 420 pounds of cream (20% milk fat) diluted with about 315 pounds of water, and agitated until the mixture is free from lumps and homogeneous. The mix is heated in a steam-jacketed, stainless steel kettle and held at a temperature of about 175° C. for five to ten minutes. When the mix has cooled to about 140° F., about 180 pounds of 100-grain vinegar and about 22 pounds of sodium chloride is thoroughly mixed therewith and the product is allowed to cool to a smooth paste or base. This base may be intimately blended with mayonnaise in any suitable proportions but preferably such that the composite product contains at least 30% vegetable oil and milk fat together. The proportions by weight may, of course, vary with the initial vegetable oil content of the mayonnaise and the desired richness of the comestible resulting from the blended mayonnaise and base.

If a caseinous flavor is deemed unobjectionable, an aqueous equivalent of the cream serum may be substituted for the cream, and a proportionate enrichment obtained, if desired, by increasing the proportion of mayonnaise to base.

The proportions of ingredients used in making the base, as well as the proportions of mayonnaise to base, are susceptible to considerable variation, but I have found that from about 2½ to 3¾ parts of dried defatted milk solids should be used in my improved base for each part of starch heretofore used in making standard salad dressing paste base. Only about 50% to 75% as much cane sugar need be used in my improved base as is usually used in making standard salad dressing paste base since the dried defatted milk solids not only has a sweetening effect but acts as a buffer to the acid.

Other edible, bacteriastatic acids, such as lactic, citric and phosphoric, may be substituted for a part of the acetic acid of the vinegar so long as the total acid imparts an acidity equivalent in bacteriastatic potency, and measurable on the basis of molecular weights by titration with a standardized alkaline solution, to at least 2.2% acetic acid based on the aqueous portion and preferably 2.4% because of the high protein content.

Other edible gums, or soluble hydrophil colloids, such as acacia (gum arabic), agar, or gum tragacanth, may be used instead of locust beam gum in such proportion as will stabilize, without unduly viscosifying, the mix and prevent or minimize precipitation or coagulation by acidification.

Having described my invention, I claim:

1. A comestible comprising a mixture of mayonnaise and a soft plastic, acidulated, starchless base having as its principal nutritious constituent a pasteurized dispersion of dried defatted milk solids.

2. A comestible base comprising a soft plastic, acidulated starchless composition having as its principal nutritious constituent a pasteurized aqueous dispersion of dried, defatted milk solids.

3. A comestible base for a dressing comprising a soft plastic, acidulated composition having as its principal nutritious constituent a pasteurized aqueous dispersion of dried defatted milk solids in the ratio of approximately .3 to .6 part of such solids to each part of the aqueous portion and an acidity equivalent in bacteriastatic potency to at least 2.2% acetic acid based on the aqueous portion.

4. A soft plastic comestible comprising a mixture of mayonnaise, milk fat and an acidulated base having as its principal nutritious constituent an aqueous dispersion of dried defatted milk solids, the proportion of said base being greater than the proportion of milk fat.

5. A comestible base for a dressing comprising a soft plastic, acidulated, pasteurized composition having as its major nutritious constituent an aqueous dispersion of dried defatted milk solids in a concentration of approximately .3 to .6 part of dried defatted milk solids to each part by weight of the aqueous portion and having as a minor nutritious constituent milk fat in a concentration of approximately .25 to .5 part of milk fat to each part of dried milk solids.

6. A comestible base for a dressing comprising a soft plastic acidulated composition containing a small proportion of edible vegetable gum and having as its major nutritious constituent a pasteurized aqueous dispersion of dried defatted milk solids and having as a minor nutritious constituent milk fat approximating .25 to .5 part of the dried defatted milk solids by weight.

7. A method of making a comestible base for a dressing which comprises heating to at least a pasteurizing heat an aqueous dispersion of dried defatted milk solids having a concentration by weight of approximately .3 to .6 part of dried defatted milk solids to one part of the aqueous portion, and agitating with the hot mixture an edible acid imparting an acidity equivalent in bacteriastatic potency to at least 2.2% acetic acid based on the aqueous portion by weight.

8. A method of making a comestible which comprises heating to at least a pasteurizing temperature an aqueous dispersion of dried defatted milk solids having a concentration of approximately .3 to .6 part of dried defatted milk solids per part of the aqueous portion, and agitating with the hot dispersion an edible acid imparting an acidity equivalent in bacteriastatic potency to at least 2.2% acetic acid based on the aqueous portion by weight, and blending mayonnaise with the acidulated dispersion.

9. A method of making a comestible base for a dressing which comprises heating to a pasteurizing temperature a dispersion of dried defatted milk solids in an aqueous dilution of cream, the dried defatted milk solids having a concentration of approximately .3 to .6 part of such solids to each part of the aqueous portion of the diluted cream, and the milk fat of the cream having a concentration of approximately .25 to .5 part to each part of dried defatted milk solids, and acidulating the hot dispersion with a food acid imparting an acidity equivalent in bacteriastatic potency to at least 2.2% parts by weight of acetic acid based on the aqueous portion.

References Cited in the file of this patent

UNITED STATES PATENTS

| | | |
|---|---|---|
| 2,170,417 | Levin | Aug. 22, 1939 |
| 2,170,518 | Musher | Aug. 22, 1939 |
| 2,203,643 | Musher | June 4, 1940 |
| 2,217,699 | Musher | Oct. 15, 1940 |